United States Patent
Muchherla et al.

(10) Patent No.: US 10,365,854 B1
(45) Date of Patent: Jul. 30, 2019

(54) TRACKING DATA TEMPERATURES OF LOGICAL BLOCK ADDRESSES

(71) Applicant: Micron Technology, Inc., Boise, ID (US)

(72) Inventors: Kishore Kumar Muchherla, Fremont, CA (US); Peter Sean Feeley, Boise, ID (US); Ashutosh Malshe, Fremont, CA (US); Sampath Ratnam, Boise, ID (US); Harish Singidi, Fremont, CA (US); Vamsi Pavan Rayaprolu, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 15/924,951

(22) Filed: Mar. 19, 2018

(51) Int. Cl.
    *G06F 3/06* (2006.01)
(52) U.S. Cl.
    CPC ............ *G06F 3/0653* (2013.01); *G06F 3/064* (2013.01); *G06F 3/0616* (2013.01); *G06F 3/0631* (2013.01); *G06F 3/0635* (2013.01); *G06F 3/0679* (2013.01)
(58) Field of Classification Search
    CPC ...... G06F 3/0614; G06F 3/0635; G06F 3/064; G06F 3/0679
    See application file for complete search history.

(56) References Cited

U.S. PATENT DOCUMENTS

| | | | |
|---|---|---|---|
| 7,818,525 B1 | 10/2010 | Frost et al. | |
| 8,117,406 B2 | 2/2012 | Whang et al. | |
| 8,291,295 B2 | 10/2012 | Harari et al. | |
| 8,489,907 B2 | 7/2013 | Wakrat et al. | |
| 8,572,310 B2 | 10/2013 | Oh et al. | |
| 8,745,319 B2 | 6/2014 | Langlois et al. | |

(Continued)

FOREIGN PATENT DOCUMENTS

| WO | WO-2014209234 A1 | 12/2014 |
|---|---|---|
| WO | WO-2019045943 A1 | 3/2019 |

OTHER PUBLICATIONS

"International Application Serial No. PCT/US2018/044794, International Search Report dated Nov. 16, 2018", 3 pgs.

(Continued)

*Primary Examiner* — Than Nguyen
(74) *Attorney, Agent, or Firm* — Schwegman Lundberg & Woessner, P.A.

(57) ABSTRACT

A variety of applications can include apparatus and/or methods that include tracking data temperatures of logical block addresses for a memory device by operating multiple accumulators by one or more data temperature analyzers to count host writes to ranges of logical block addresses. Data temperature for data written by a host is a measure of how frequently data at a logical block address is overwritten. In various embodiments, tracking can include staggering the start of counting by each of the multiple accumulators to provide subsequent binning of logical block addresses bands into temperature zones, which can achieve better data segregation. Data having a logical block address received from a host can be routed to a block associated with a temperature zone based on the binning provided by the staggered operation of the multiple accumulators by one or more data temperature analyzers. Additional apparatus, systems, and methods are disclosed.

25 Claims, 10 Drawing Sheets

(56) References Cited

U.S. PATENT DOCUMENTS

| | | |
|---|---|---|
| 8,880,779 B2 | 11/2014 | Fai et al. |
| 8,904,146 B1 | 12/2014 | Lazar et al. |
| 8,966,319 B2 | 2/2015 | Fai et al. |
| 9,176,864 B2 | 11/2015 | Gorobets et al. |
| 9,342,389 B2 | 5/2016 | Tang et al. |
| 9,389,805 B2 | 7/2016 | Cohen et al. |
| 9,405,717 B2 | 8/2016 | Brontvein et al. |
| 9,747,158 B1 | 8/2017 | Kannan et al. |
| 2008/0195801 A1 | 8/2008 | Cheon et al. |
| 2008/0307192 A1 | 12/2008 | Sinclair et al. |
| 2010/0312948 A1 | 12/2010 | Yano et al. |
| 2012/0254699 A1 | 10/2012 | Ruby et al. |
| 2012/0268994 A1* | 10/2012 | Nagashima ......... G06F 11/1048 365/185.11 |
| 2012/0297122 A1 | 11/2012 | Gorobets et al. |
| 2014/0254042 A1* | 9/2014 | Yeo .................... G11B 20/1217 360/48 |
| 2014/0279941 A1* | 9/2014 | Atkisson ............. G06F 16/2365 707/690 |
| 2014/0281260 A1* | 9/2014 | Peterson ............... G06F 3/0616 711/135 |
| 2015/0092489 A1 | 4/2015 | Wu et al. |
| 2015/0127889 A1 | 5/2015 | Hwang |
| 2015/0347028 A1 | 12/2015 | Kotte et al. |
| 2015/0347029 A1 | 12/2015 | Kotte |
| 2016/0124679 A1 | 5/2016 | Huang et al. |
| 2016/0139812 A1* | 5/2016 | Zhang ................... G06F 3/0608 711/103 |
| 2016/0148702 A1 | 5/2016 | Karakulak et al. |
| 2017/0024163 A1* | 1/2017 | Zhang ................... G06F 3/0647 |
| 2017/0024326 A1 | 1/2017 | Luo et al. |
| 2017/0148510 A1 | 5/2017 | Bazarsky et al. |
| 2019/0066739 A1 | 2/2019 | Muchherla et al. |
| 2019/0122705 A1 | 4/2019 | Muchherla et al. |

OTHER PUBLICATIONS

"International Application Serial No. PCT/US2018/044794, Written Opinion dated Nov. 16, 2018", 9 pgs.

U.S. Appl. No. 15/692,407, filed Aug. 31, 2017, Optimized Scan Interval.

"U.S. Appl. No. 15/692,407, Notice of Allowance dated Apr. 12, 2018", 9 pgs.

Ma, Dongzhe, et al., "LazyFTL: A Page-level Flash Translation Layer Optimized for NAND Flash Memory", SIGMOD'11, (2011), 12 pgs.

Park, Chanik, et al., "A Reconfigurable FTL (Flash Translation Layer) Architecture for NAND Flash-Based Applications", ACM Transactions on Embedded Computing Systems, vol. 7, No. 4, Article 38, (Jul. 2008), 23 pgs.

Yang, Soo-Hyeon, et al., "An Efficient Mapping Table Management in NAND Flash-Based Mobile Computers", B. Murgante et al. (Eds.): ICCSA 2011, Part III, LNCS 6784, (2011), 518-527.

* cited by examiner

TRACKING DATA TEMPERATURES OF LOGICAL BLOCK ADDRESSES

BACKGROUND

Memory devices are typically provided as internal, semiconductor, integrated circuits in computers or other electronic devices. There are many different types of memory, including volatile and non-volatile memory. Volatile memory requires power to maintain its data, and examples of volatile memory include random-access memory (RAM), dynamic random-access memory (DRAM), and synchronous dynamic random-access memory (SDRAM), among others. Non-volatile memory can retain stored data when not powered, and examples of non-volatile memory include flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), and three-dimensional (3D) XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the memory cells in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate and can be referred to as a planar memory array. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples, the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

In NAND flash based storage systems, data stored in a NAND memory device can be categorized with respect to how frequently data is overwritten, that is, how frequently data is written to an address by a host processor or processors, where a logical block address (LBA) can be provided as the address. One or more host processors may be referred to herein as a host or host processor. Host data typically consists of different flavors of data, where data at an LBA can be categorized in terms of a data temperature. Data temperature is a measure of frequency of access. Cold data is data at an address that is not frequently over-written by a host. Cold data may be considered as static data such as media files which are not often rewritten, examples of which can include, but is not limited to, an operating system (OS), video files, music files, and pictures. Hot data is data at an address that is frequently over-written by a host. Hot data, which effectively may be continuously being over-written by a host, can include, for example but not limited to, system metadata. Metadata is data that is information about other data. The data temperatures can also include other temperatures such as normal, warm, and other graduations of frequency of access fro rewriting. In workloads for SSD and mobile device applications, a host does not specify which data is hot and which data is cold when sending a write command to a memory device.

To maintain continuous pool of free blocks for host data, firmware continuously does garbage collection (GC) at the system level. Firmware for a device can comprise instructions, such as microcode, which when executed by a controller such as a processor, can cause the device to perform operations. A GC procedure for a NAND device structure is directed to recover free space when the free physical space in the NAND device becomes low. GC typically includes recopying logical valid pages from a source block to a destination block. However, GC can be a factor that causes write amplification. Write amplification is a condition associated with flash memories and solid-state drives in which the actual amount of information physically written to the storage media is a multiple of the logical amount intended to be written.

Since flash memory is erased before it can be rewritten, the process to perform these operations results in rewriting, realized by moving, host data and metadata more than once. The erase operation is associated with coarser granularity compared to the write operation. As a result, larger portions of flash are erased and rewritten than actually required by the amount of new data from the host. This multiplying effect increases the number of writes required over the life of the SSD which shortens the time it can reliably operate. A write amplification factor can be calculated as is a numerical value that represents the amount of data a solid state storage controller has to write in relation to the amount of data that the host's flash controller has to write. The numerical value can be calculated as a rate by dividing the amount of data written to the flash memory by the amount of data written by the host. A write amplification factor of one means that the amount of data written to a flash memory equals the amount of data written by the host. Many elements contribute to the write amplication factor including efficiency of the GC procedure. Garbage collection eats away into the bandwidth of a memory controller, because the controller now has to service both host as well garbage collection events. Enhancements to memory structure and processes to minimize or reduce garbage collection can allow a memory controller to increase its maximum time servicing the host. In NAND flash based storage systems, improvements of NAND flash based storage systems can include improvements in garbage collection in the arrangement of data storage within a NAND memory device.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

In various embodiments, firmware can be implemented that segregates an entire range of valid LBAs into multiple bins, tracks the host LBA over-write of each LBA bin, and assigns various degrees of hotness to each LBA bin. The hotness characterization can be implemented as a real time process. Such a real time characterization can provide a closed loop feedback, tracking any changes in the host usage model. Write amplification can be minimized by separating cold data and hot data. This strategy can have immense write amplification and performance benefit in workloads where the host partitions the drive into media partitions and metadata partitions. In addition, by being able to route the cold data, such as media data, and hot data, such as metadata, into separate blocks the garbage collection effort can be reduced. While benefits of data segregation is well understood, data segregation, as taught herein, can be adapted to the every changing workloads of the memory system, which can include tracking changes in the host data pattern.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

Figure 1:
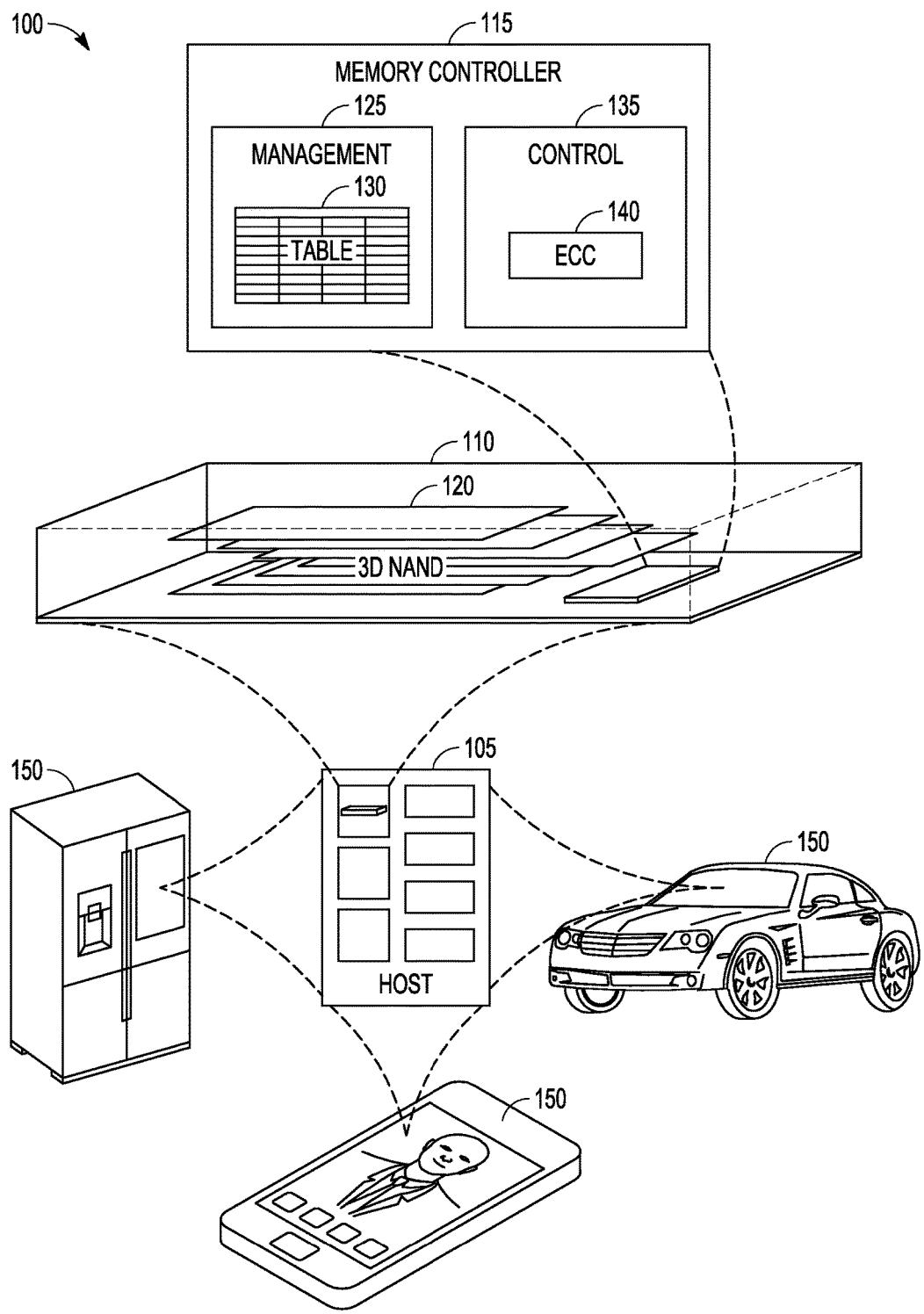
FIG. 1 illustrates an example of an environment including a memory device, according to various embodiments.

FIG. 1 illustrates an example of an environment 100 including a host device 105 and a memory device 110 configured to communicate over a communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 may be a machine having some portion, or all, of the components discussed in reference to the machine 500 of FIG. 5.

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110. The memory controller 115 can include one or more input/output (I/O) circuits, lines, or interfaces to transfer data to or from the memory array 120.

The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page; whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
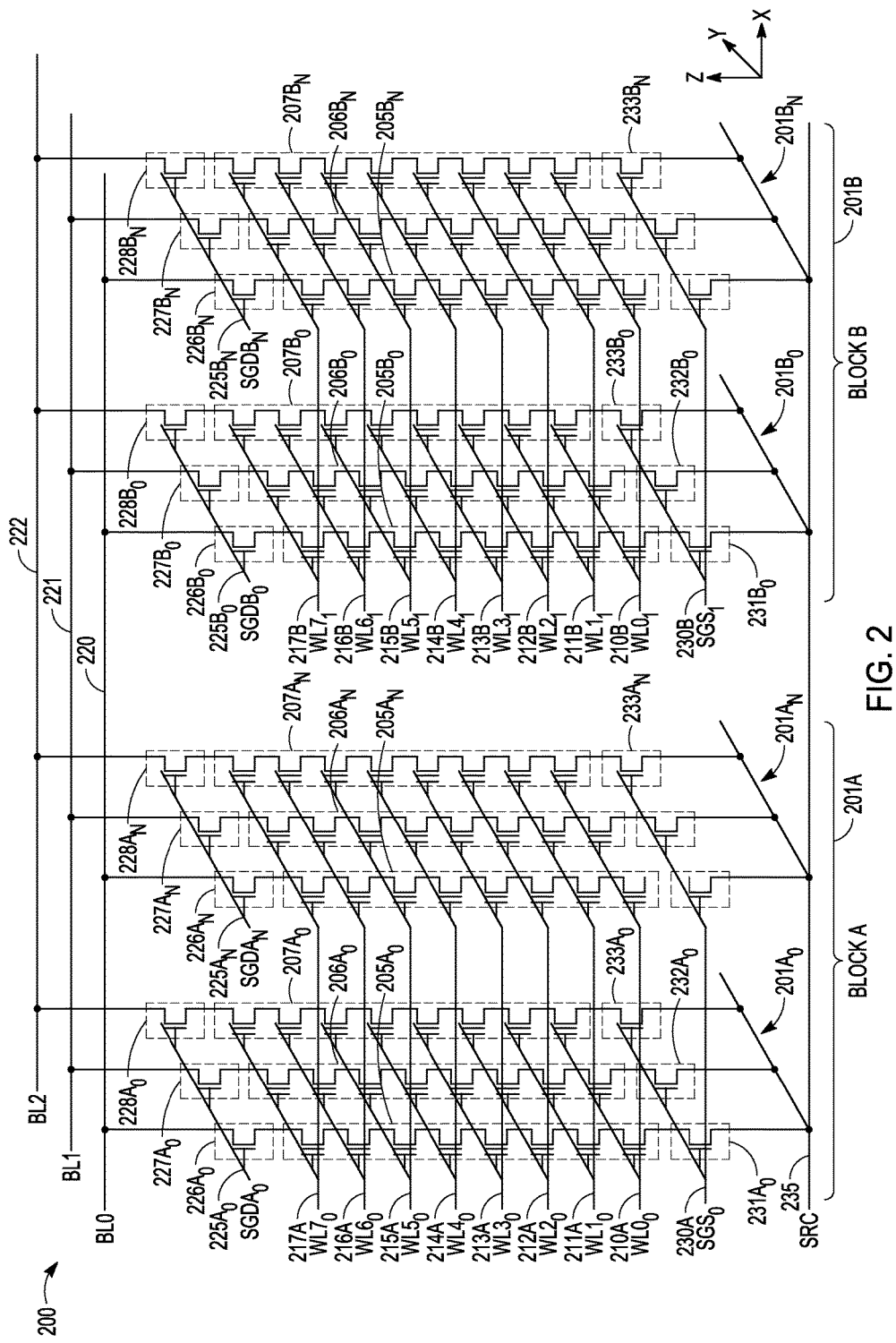
FIGS. 2 and 3 illustrate schematic diagrams of an example of a three-dimensional NAND architecture semiconductor memory array, according to various embodiments.

FIG. 2 illustrates an example schematic diagram of a 3D NAND architecture semiconductor memory array 200 including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ 201$A_0$, sub-block $A_n$ 201$A_n$, sub-block $B_0$ 201$B_0$, sub-block $B_n$ 201$B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_n$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
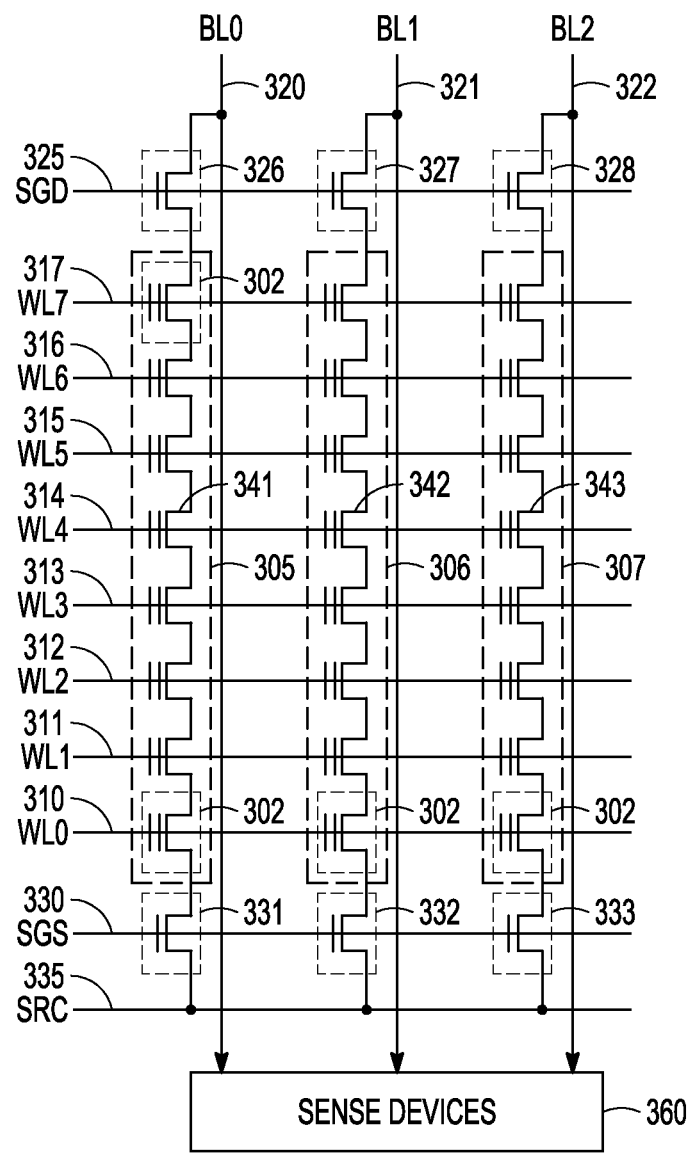

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
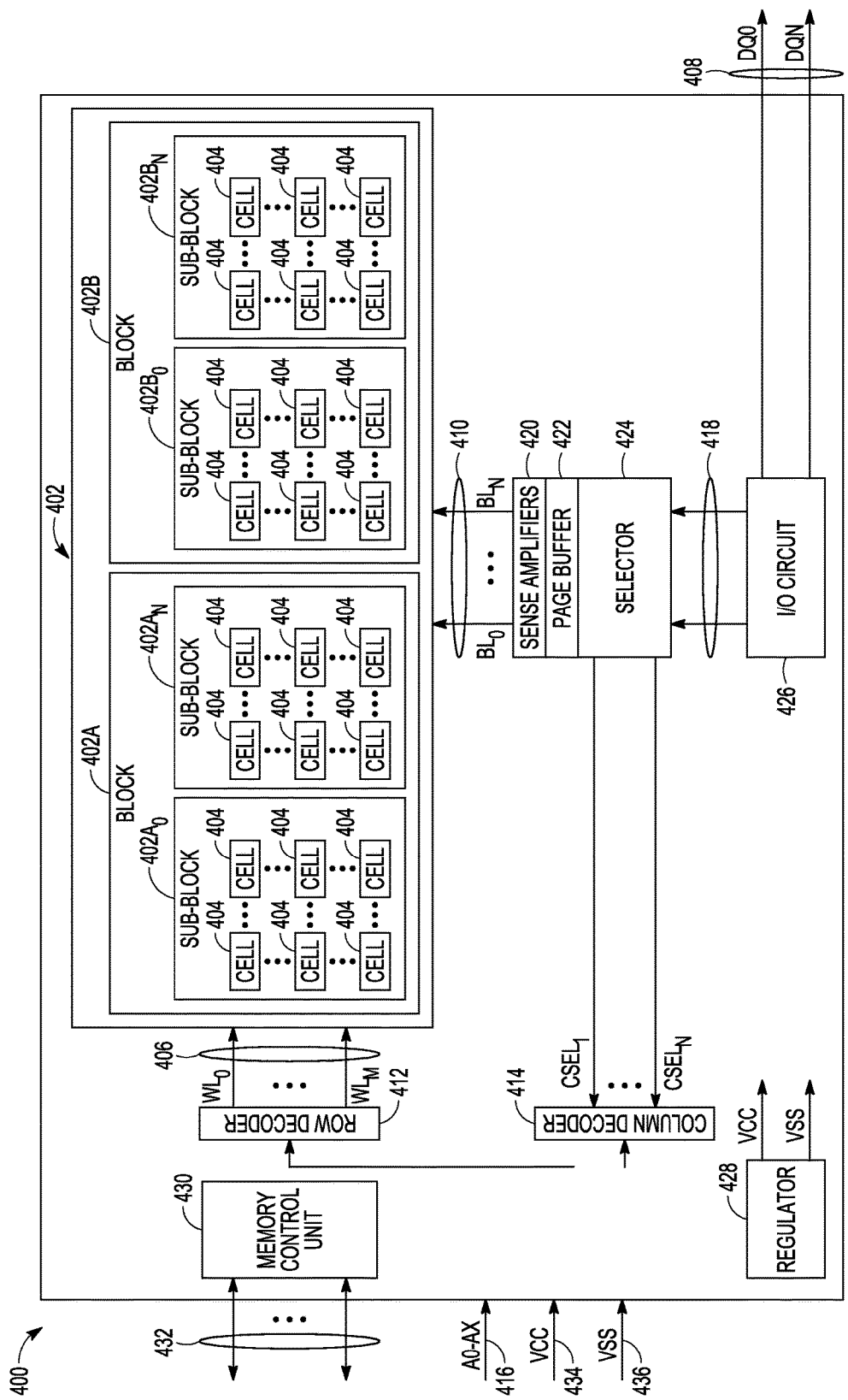
FIG. 4 illustrates an example block diagram of a memory module, according to various embodiments.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
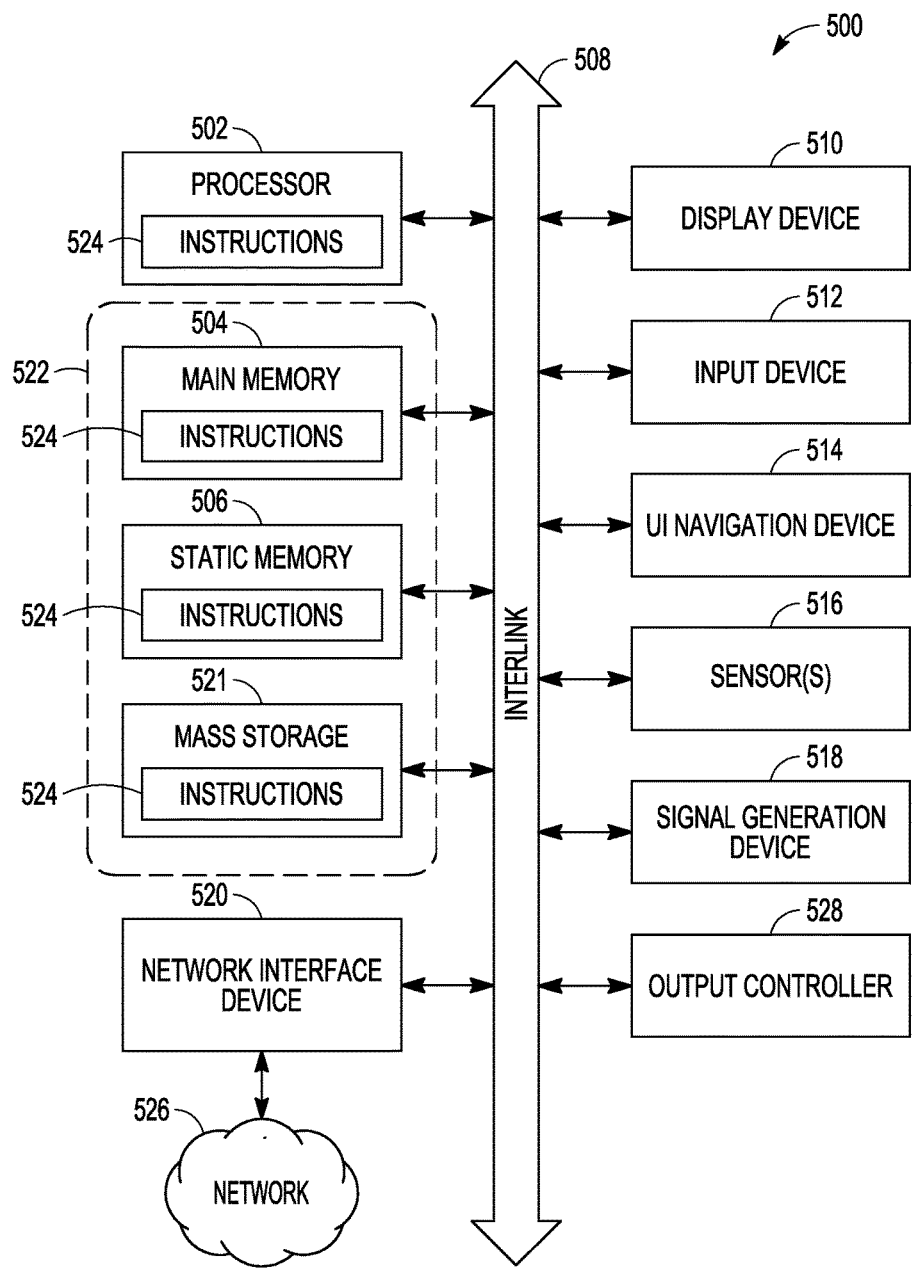
FIG. 5 is a block diagram illustrating an example of a machine upon which one or more embodiments may be implemented, according to various embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) may include a hardware processor 502 (e.g., a central processing unit (CPU), a graphics processing unit (GPU), a hardware processor core, or any combination thereof, such as the memory controller 115, etc.), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 521 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 521 may constitute the machine readable medium 522.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage 521 device is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid paging to the storage device 521. Paging takes place in the compressed block until it is necessary to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Figure 6:
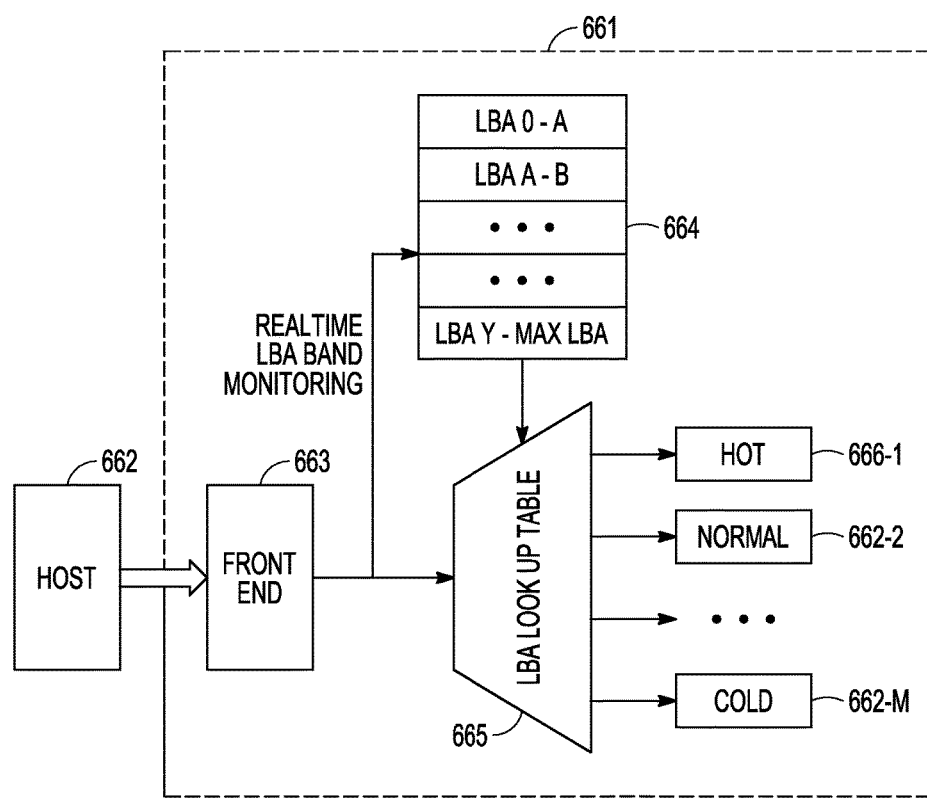
FIG. 6 is a block diagram of an example operation of a host with a system, according to various embodiments.

FIG. 6 is a block diagram of an embodiment of an example operation of a host 662 with a system 661. System 661 can include a controller, random access memory (RAM), firmware, and a NAND. Host 662 can transmit control and commands directed to a front end 663 for the NAND. Front end 663 can include the controller and other circuitry to interface the NAND with host 662. The firmware can provide instructions to perform real time monitoring of the LBA bands and can include LBA bands accumulator 664. The entire set of LBAs can be divided into ranges, such as LBA 0-A, LBA A-B, . . . LBA Y-max LBA. The number of LBAs may vary among the different ranges. LBA bands accumulator 664 provides an overwrite calculator that can count the number of times host 662 writes into each range of the set of LBA ranges. The counts in the LBA bands accumulator 664 can be provided to a LBA look up table (LUT) 665 for real time LBA band hotness grouping. LUT 665 can be stored in the RAM of system 661.

Instructions of the firmware of system 661 in conjunction with LUT 665 can route host data received at front end 663 to different host cursors based on LBA band hotness. A host cursor of the NAND is a host block, where a host block of the NAND is a block of the NAND that stores data from host 662. The host data is routed to multiple open host blocks 666-1, 666-2, . . . 666-M of the NAND for different degrees of hotness. The firmware can segregate the data temperatures according to different data temperatures. For example, the data temperatures can be hot, normal, and cold, as shown in FIG. 6 as an example. Other temperature levels can be implemented by the firmware. The firmware can set the parameters of overwrite to define the different data temperatures. Such parameters can include the amount of writing to a range that corresponds to each data temperature, which the firmware can adjust by analysis over operation of system 661.

A relatively straight forward implementation of tracking data temperatures in real time can include write count accumulation for each LBA group. One caveat for this approach is that a host, which is a user apparatus with respect to a memory platform, may switch the workload at any time, and, additionally, may switch application of LBA bands. For example, a user host may use LBA band-X for hot data for the first 10% of drive life, but use the LBA band-X for cold data for rest of the drive life. In this case, an issue can include how the system can overcome the high write count saturation of band-X for rest of the drive life. If the system relies on the write count alone, until the remaining LBA bands gain significantly higher write count than LBA band-X, band-X will continue to be binned as hottest band. This situation can result in significant under design.

In another approach, each and every LBA band may be time-stamped. Any time an LBA band is unused for certain amount of time between writes (TBW) or time stamp, the LBA band can be marked as a cold band although the write count is higher on the band than for a cold band. This approach of time stamping each LBA band can fail if every LBA band is touched by host on a random basis. In this example, in terms of amount of data written, band-X may have significantly gone down, but in terms of frequency at which band-X is touched by host, the frequency may be on par with other LBA bands. In this case, time stamping the latest access on each LBA band does not meet the objective.

In various embodiments, multiple data temperature analyzers can be maintained. A data temperature analyzer, herein, is a set of one or more circuits that can analyze given data with respect to overwritting at a LBA. The set can be realized as hardware having instructions to examine in detail, defined by the instructions, structure of the given data and to find patterns and relationships between parts of the data. The instructions can be realized as stored instructions executable by a controller. The instructions can be maintained as firmware for a NAND memory device.

Each data temperature analyzer can be structured to operate with respect to a training size and an update size. The training size can be treated as the total amount of written data that needs to be analyzed to assign the temperatures for each LBA band. The update size is a write size interval used in determing when a snap shot is to be taken of the data temperatures of the LBA bands by a data temperature analyzer. The training size and the update size can be used to determine the number of data temperature analyzers to be implemented and run by the firmware. The number of data temperature analyzers can be calculated by the ratio of the training size and the update size, (Training size)/(Update size).

In operation, the start of multiple data temperature analyzers can be staggered from each other by the update size. Any time that the total host data tracked by a data temperature analyzer hits the full training size, a snap shot the data temperature for each LBA band can be captured by the given data temperature analyzer. Once the snap shot is captured, write counters can be reset to a reference level, such as zero, in the data temperature analyzer to begin again counting host writes to the bands from the reference level. This process can be repeated for each full training size of host data written and for each data temperature analyzer of the multiple data temperature analyzers.

Figure 7:
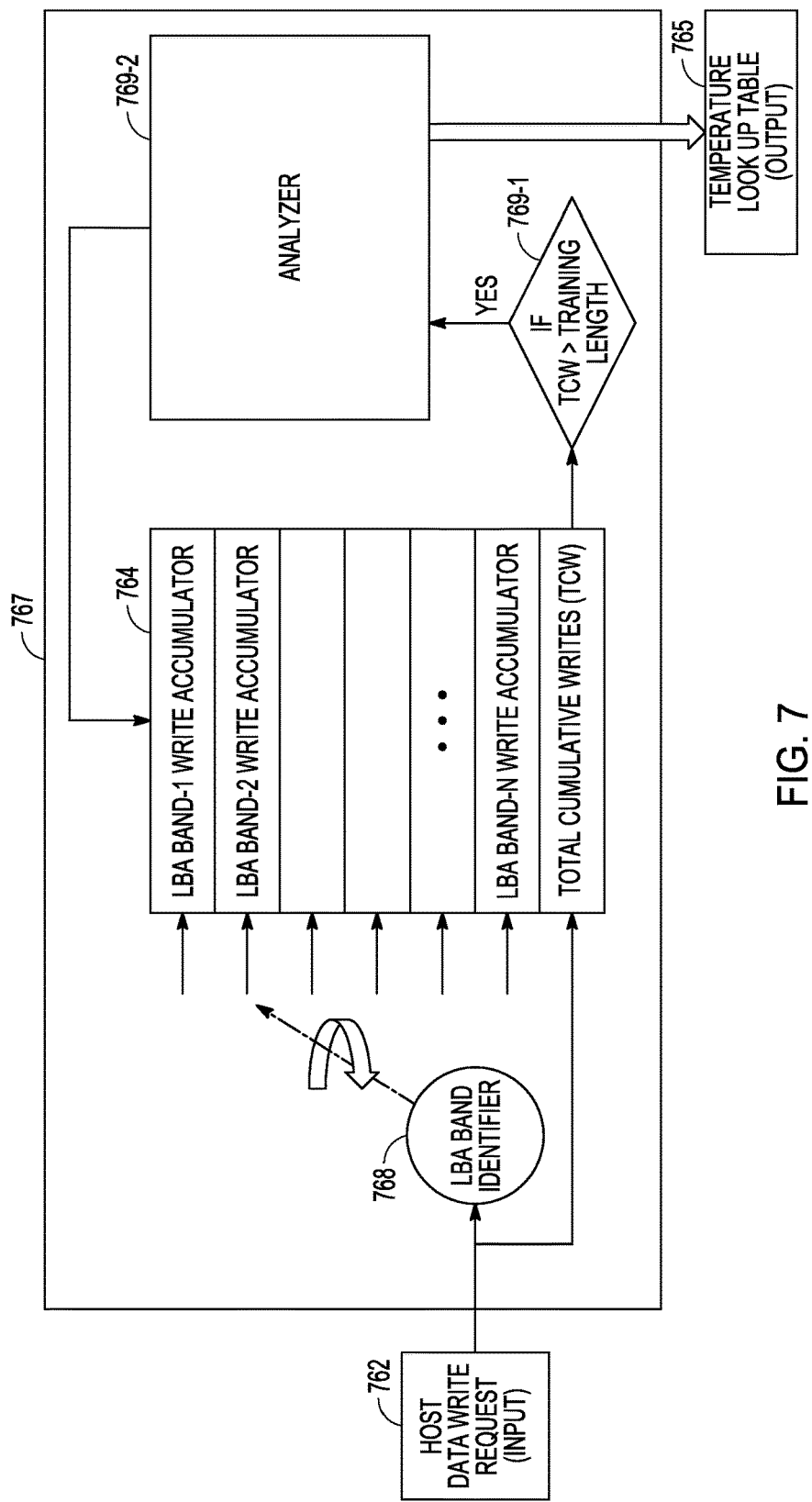
FIG. 7 is a functional diagram of an example data temperature analyzer with only a single accumulator having a number of band accumulators, according to various embodiments.

FIG. 7 is a functional diagram of an embodiment of an example data temperature analyzer 767 with only a single accumulator 764 having a nunber of band accumulators. Single accumulator 764 accumulates the total cumulative writes (TCW) from a number of band accumulators of accumulator 764. Accumulator 764 can include LBA band-1 write accumulator, LBA band-2 write accumulator . . . LBA band-N write accumulator. Each of LBA band-1 write accumulator, LBA band-2 write accumulator . . . LBA band-N write accumulator counts the number of writes to its corresponding LBA Band.

An input for data temperature analyzer 767 can include a host data write request 762. Host data write request 762 can include a host command having a start LBA address and the number of LBAs that needs to be written to the NAND for which data temperature analyzer 767 operates. Data temperature analyzer 767 can include an LBA band identifier 768, which determines the appropriate LBA band accumulator to be updated in count corresponding to the host data write request 762. In addition, the host data write request 762 can be directed to accumulator 764 to provide a TCW. Data temperature analyzer 767 can include a comparison 769-1 of the TCW to the training length. If the TCW is less than the training length, the accumulator 764 maintains its count until the next host write request is received. If the TCW is greater than the training length, the process proceeds to analyzer 769-2 of data temperature analyzer 767. With the activation of analyzer 769-2, a reset signal is sent to accumulator 764 to reset the count of the write accumulator of each LBA band and to reset the total cumulative write count to a reference level, such as zero.

Analyzer 769-2 can sort the LBA bands by cumulative writes of each band, and can allocate a data temperature for each LBA band. Bands with the minimum write size are at the coldest temperature and bands with the maximum write size are art the hottest temperature. Analyzer 769-2 can map the number, X, of LBA bands into the number, Y, of temperature zones. Analyzer 769-2 can provide the mapping to an LBA temperature LUT 765 as an output. The mapping by analyzer 769-2 provides a snapshot of the data temperature distribution as of the time of sampling by accumulator 764 of data temperature analyzer 767, which can update the data temperatures of the LBA ranges. Another accumulator of another data temperature analyzer, arranged in a similar operational manner to accumulator 764 of data temperature analyzer 767, can provide another snapshot, which can update the data temperatures of the LBA ranges at a later time with respect to host writes to the NAND memory device.

Figure 8:
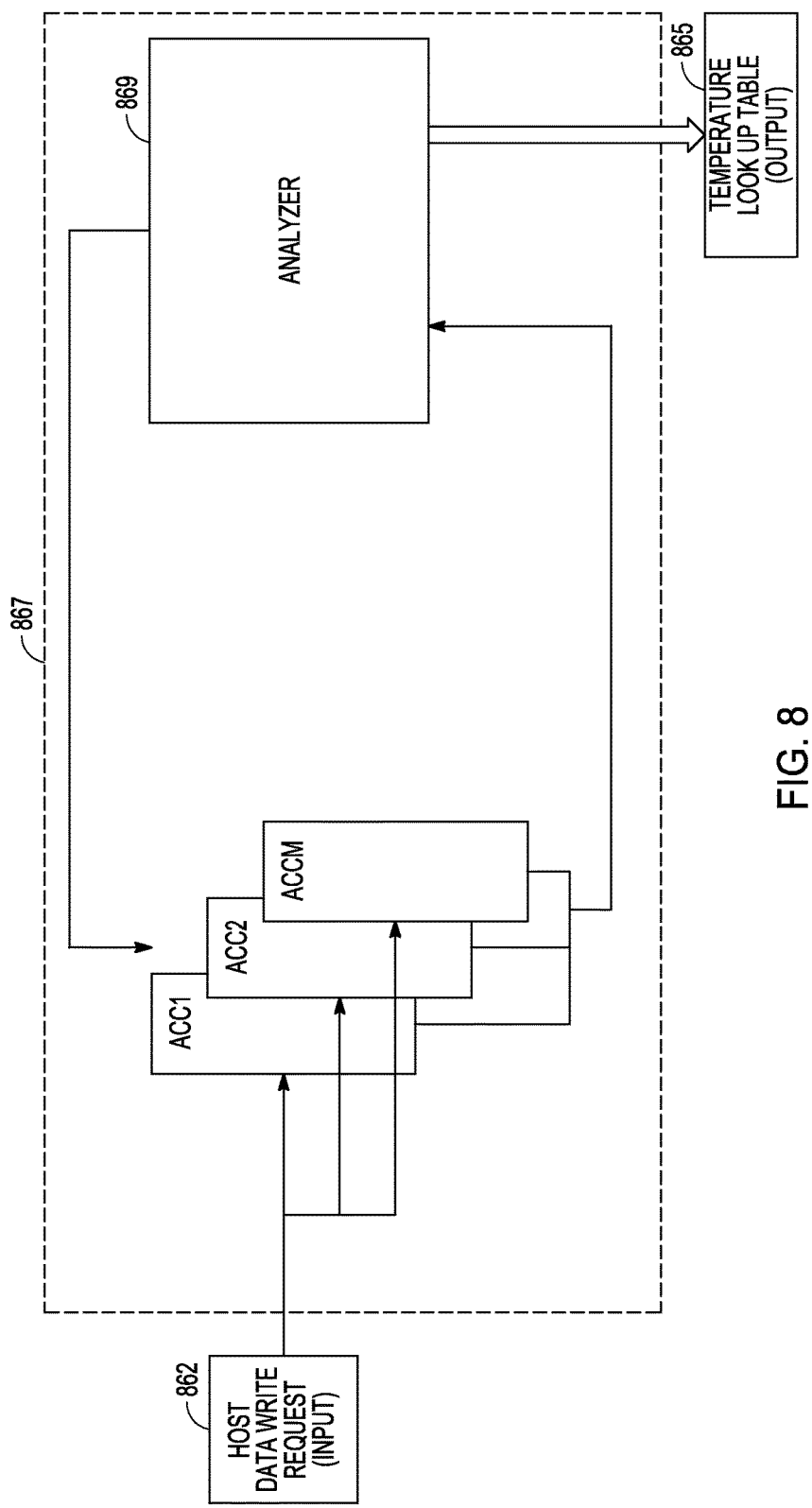
FIG. 8 is a functional diagram of an example temperature analyzer with multiple accumulators, according to various embodiments.

FIG. 8 is a functional diagram of an embodiment of an example temperature analyzer with multiple accumulators. While data temperature analyzer 767 of FIG. 7 is one data temperature analyzer of multiple data temperature analyzers implemented, data temperature analyzer 867 includes a number of accumulators ACC1, ACC2 . . . ACCM that can provide counting functionality of the multiple data temperature analyzers for which data temperature analyzer 767 is one. Each accumulator of the number of accumulators ACC1, ACC2 . . . ACCM counts the number of host writes to each LBA range for each of the multiple LBA ranges into which the LBA addresses are divided. Additionally, each accumulator of accumulators ACC1, ACC2 . . . ACCM can generate a TCW for all the LBA ranges, and can be operated by data temperature analyzer 867 independently of the other accumulators of accumulators.

An input for data temperature analyzer 867 can include a host data write request 862. Host data write request 862 can include a host command having a start LBA address and the number of LBAs that needs to be written to the NAND. Data temperature analyzer 867 can determine which count of host written is updated for the appropriate LBA band. Data temperature analyzer 867 can select one of the accumulators ACC1, ACC2 . . . ACCM whose TCW is greater that the predetermined training length. Data temperature analyzer 867 may select one of the accumulators ACC1, ACC2 . . . ACCM whose TCW is equal to the predetermined training length. The accumulation counts of the bands of the set of bands for the NAND memory device by the selected accumulator and the cumulative amount of the accumulation counts can be provided to an analyzer 869 as a current sample. With the presentation of the current sample from the selected accumulator of accumulators ACC1, ACC2 . . . ACCM to analyzer 869, analyzer 869 can send a reset signal to the selected accumulator to reset the counts of the LBA bands to a reference, such as zero, and the TCW in the selected accumulator to a corresponding reference, such as zero.

Analyzer 869 can sort the LBA bands by cumulative writes of each band, and can allocate a data temperature for each LBA band. Bands with the minimum write size are at the coldest temperature and bands with the maximum write size are at the hottest temperature. Analyzer 869 can map the number, X, of LBA bands into a number, Y, of temperature zones. Analyzer 869 can provide the mapping to an LBA temperature LUT 865 as an output. The current sample provides a snapshot of the data temperature distribution as of the time of sampling. A next selected accumulator of accumulators ACC1, ACC2 . . . ACCM can provide another snapshot, which can update the data temperatures of the LBA ranges.

Figure 9:
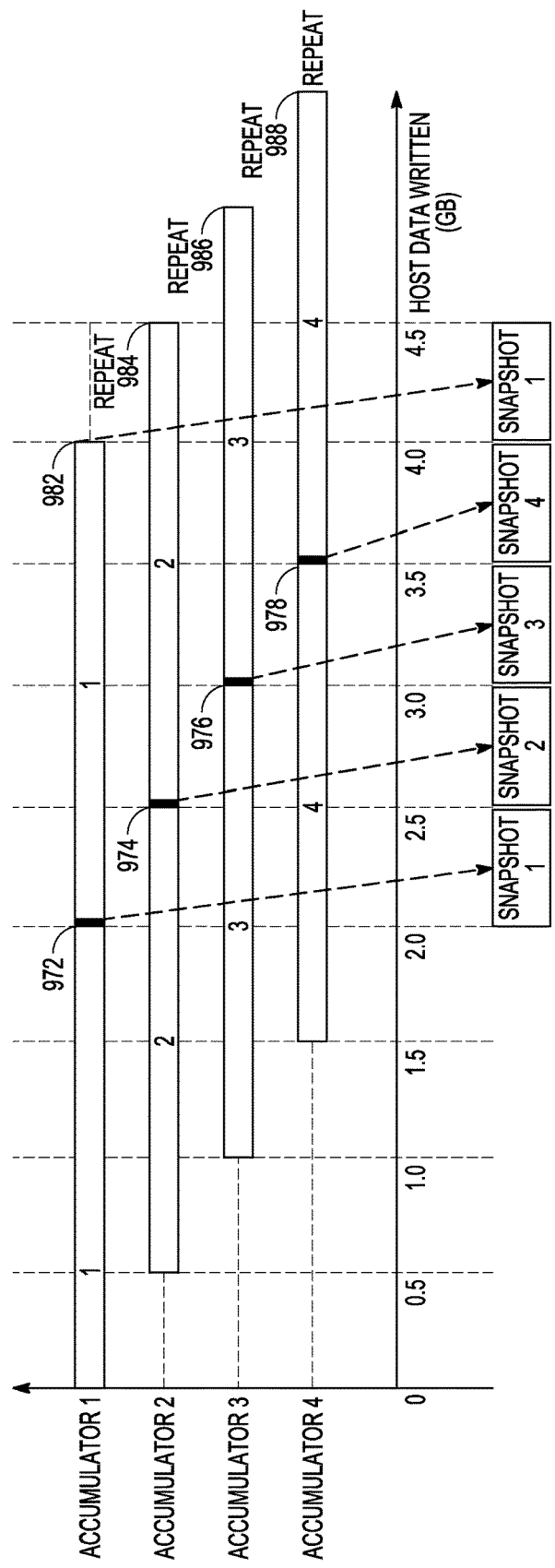
FIG. 9 is a timing diagram illustrating of an example of staggering multiple accumulators, according to various embodiments.

FIG. 9 is a timing diagram illustrating of an embodiment of an example of staggering multiple accumulator. The timing is in terms of the amount of host written data rather than time. For ease of presentation, four accumulators are shown. The number of accumulators may be more or less than four. Accumulator 1 may be from a first data temperature analyzer or may be a first accumulator of a common data temperature analyzer. Accumulator 2 may be from a second data temperature analyzer or may be a second accumulator of the common data temperature analyzer. Accumulator 3 may be from a third data temperature analyzer or may be a third accumulator of the common data temperature analyzer. Accumulator 4 may be from a fourth data temperature analyzer or may be a fourth accumulator of the common data temperature analyzer. A start of the accumulation of a host count by each accumulator for each LBA range can be staggered by an update size from a start of another accumulator of the multiple accumulators such that each of the accumulator start their count at different amounts of host data written to the NAND memory device with respect to a reference, such as a reference zero count.

In the example of FIG. 9, the update size is selected to be 0.5 GB host data written, though other sizes for the update size can be used. For every 0.5 GB of host data written, a snapshot of the host data written is captured from one of the accumulators, accumulator 1 . . . accumulator 4 using their associated analyzer. The captured snapshot provides an update to a temperature LUT table. In this example, a snapshot is taken on accumulator 1 using its associated analyzer followed by accumulator 2 using its associated analyzer, accumulator 3 using its associated analyzer, and accumulator 4 using its associated analyzer 4. The snapshots can be captured in a ring fashion, with a snapshot again taken on accumulator 1 using its associated analyzer after the snapshot taken on accumulator 4 using its associated analyzer. This next snapshot taken on accumulator 1 using its associated analyzer is followed by accumulator 2 using its associated analyzer, accumulator 3 using its associated analyzer, and accumulator 4 using its associated analyzer 4. This process can continue in its ring fashion.

Snapshot of each accumulator using its associated analyzer can be derived from its training length. The training length can be determined from an analysis of history of previously written host data. In this example, the training length can be derived from 2 GB history of previously written host data. Depending on the particular implementation and host usage of the NAND memory device, the training length may be more or less than 2 GB. In the example of FIG. 9, accumulator 1 is initiated to count host data writes to the set of LBA ranges beginning at reference zero count. After 0.5 GB of host data writes from accumulator 1's reference zero count, accumulator 2 is initiated to count host data writes to the set of LBA ranges from its reference zero count. After another 0.5 GB of host data writes equal to 1.0 GB host data writes from accumulator 1's reference zero count, accumulator 3 is initiated to count host data writes to the set of LBA ranges from its reference zero count After another 0.5 GB of host data writes equal to 1.5 GB host data writes from accumulator 1's reference zero count, accumulator 4 is initiated to count host data writes to the set of LBA ranges from its reference zero count.

At 972, accumulator 1 has a TCW equal to the training length, which triggers a snapshot 1 of the data temperature of the LBA bands and a reset event to reference zero to accumulate counts of host data writes to each LBA range and the TCW for accumulator 1. This snapshot can be used as the data temperature LUT table, which can be used to route data having a logical block address received from a host to a physical block associated with a temperature zone of a number of data temperature zones based on a band of the set of bands of logical block addresses in which the received logical block address belongs and on the data temperature look-up-table updated by snapshot 1. The temperature zones can include cold, normal, and hot. In various embodiments, the set of temperature zones can include more temperature zones than cold, normal, and hot. After a snapshot is derived from an analyzer associated with accumulator 1, the host data write counts can be reset and the host data write size accumulation can be restarted.

At 974, accumulator 2 has a TCW equal to the training length, which triggers a snapshot 2 of the data temperature of the LBA bands and a reset event to reference zero to accumulate counts of host data writes to each LBA range and the TCW for accumulator 2. Snapshot 2 can be used as the data temperature LUT table, rather than snapshot 1, where the data temperature LUT table updated by snapshot 2 can be used to route data having a logical block address received from a host to a physical block associated with a temperature zone. After a snapshot is derived from an analyzer associated with accumulator 2, the host data write counts can be reset and the host data write size accumulation can be restarted for accumulator 2.

At 976, accumulator 3 has a TCW equal to the training length, which triggers a snapshot 3 of the data temperature of the LBA bands and a reset event to reference zero to accumulate counts of host data writes to each LBA range and the TCW for accumulator 3. Snapshot 3 can be used as the data temperature LUT table, rather than snapshots 1 or 2, where the data temperature LUT table updated by snapshot 3 can be used to route data having a logical block address received from a host to a physical block associated with a temperature zone. After a snapshot is derived from an analyzer associated with accumulator 3, the host data write counts can be reset and the host data write size accumulation can be restarted for accumulator 3.

At 978, accumulator 4 has a TCW equal to the training length, which triggers a snapshot 4 of the data temperature of the LBA bands and a reset event to reference zero to accumulate counts of host data writes to each LBA range and the TCW for accumulator 4. Snapshot 4 can be used as the data temperature LUT table, rather than snapshots 1, 2, or 3, where the data temperature LUT table updated by snapshot 4 can be used to route data having a logical block address received from a host to a physical block associated with a temperature zone. After a snapshot is derived from an analyzer associated with accumulator 4, the host data write counts can be reset and the host data write size accumulation can be restarted for accumulator 4.

At 982, accumulator 1 again has a TCW equal to the training length, which triggers another snapshot 1 of the data temperature of the LBA bands and a reset event to reference zero to accumulate counts of host data writes to each LBA range and the TCW for accumulator 1. This new snapshot 1 can be used as the data temperature LUT table, which can be used to route data having a logical block address received from a host to a physical block associated with a temperature zone. The event at 982 can be processed as a repeat of the process associated with event 974.

At 984, accumulator 2 again has a TCW equal to the training length, which triggers another snapshot 2 of the data temperature of the LBA bands and a repeat of the process associated with event 974. At 986, accumulator 3 again has a TCW equal to the training length, which triggers another snapshot 3 of the data temperature of the LBA bands and a repeat of the process associated with event 976. At 988, accumulator 4 again has a TCW equal to the training length, which triggers another snapshot 4 of the data temperature of the LBA bands and a repeat of the process associated with event 978.

Figure 10:
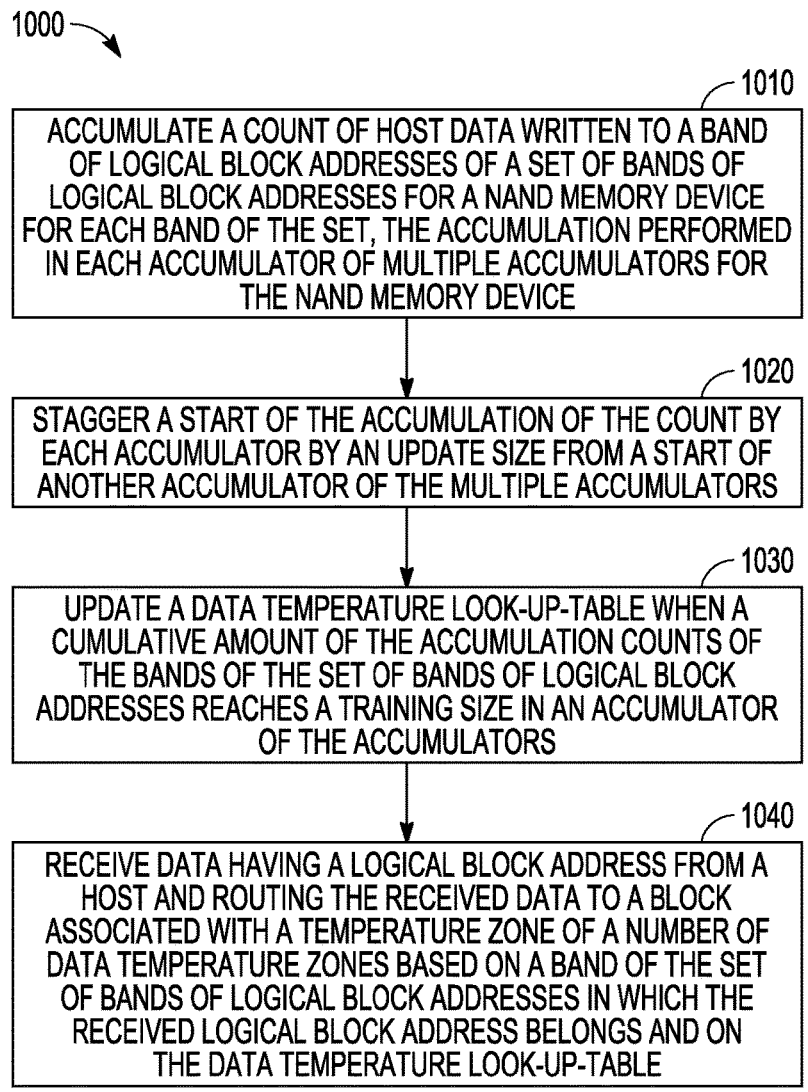
FIG. 10 is a flow diagram of features of an example method of operating a NAND device, according to various embodiments.

FIG. 10 is a flow diagram of features of an embodiment of an example method of operating a NAND device. At 1010, a count of host data written to a band of logical block addresses of a set of bands of logical block addresses for a NAND memory device is accumulated for each band of the set, where the accumulation is performed in each accumulator of multiple accumulators for a NAND memory device. Each accumulator of the multiple accumulators can be structured as a single accumulator in a temperature analyzer of a set of multiple temperature analyzers, where each temperature analyzer is separate from the other temperature analyzers of the set. At 1020, a start of the accumulation of the count by each accumulator is staggered by an update size from a start of another accumulator of the multiple accumulators. Each of the accumulators can start their count at different amounts of host data written to the NAND memory device with respect to a reference zero count.

At 1030, a data temperature look-up-table is updated when a cumulative amount of the accumulation counts of the bands of the set of bands of logical block addresses reaches a training size in an accumulator of the accumulators. Updating the data temperature look-up-table can include sorting the bands of the set of bands of logical block addresses by the accumulation count of each band for the respective accumulator of the multiple accumulators, and allocating a data temperature for each sorted band. Updating the data temperature look-up-table can include updating the data temperature look-up-table using entries generated using a accumulator having a start triggered by the update size from an accumulator that last updated the data temperature look-up-table. Updating the data temperature look-up-table can include updating the data temperature look-up-table using each accumulator of the multiple accumulators in a sequence in a ring manner in which updating the data temperature look-up-table by a last started accumulator is followed by updating the data temperature look-up-table by a first started accumulator.

At 1040, data having a logical block address is received from a host and the received data is routed to a block associated with a temperature zone of a number of data temperature zones based on a band of the set of bands of logical block addresses in which the received logical block address belongs and on the data temperature look-up-table. Routing the received data can include controlling routing of the received data into open blocks of the memory array arranged according to hot, normal, and cold parameters. Controlling routing of the received data into open blocks of the memory array can include controlling routing the received data such that invalid data is substantially in blocks having hot data. Routing the received data can include controlling routing of the received data into open blocks of the memory array arranged according to cold block parameters and hot block parameters.

Variations of method 1000 or methods similar to method 1000 can include a number of different embodiments that may be combined depending on the application of such methods and/or the architecture of systems in which such methods are implemented. Such methods can include segregating an entire valid range of logical block addresses of the NAND memory device into the bands of the set of bands of logical block addresses. Method 1000 or similar methods can include setting the counts of each accumulator to zero and beginning another count when the cumulative amount of the accumulation counts of the bands of the set of bands of logical block addresses reaches a training size for the respective accumulator. Method 1000 or similar methods can include adaptively adjusting the number of LBA bands in the set of bands of logical block addresses based on one or more gradients of consecutive LBA bands.

In various embodiments, an apparatus can comprise: a memory device having a memory array of memory cells, the memory array arranged in blocks of memory cells, and firmware having stored instructions to operate on the memory array arranged in correspondence with logical block addresses. The instructions can include operations to: accumulate a count of host data written to a band of logical block addresses of a set of bands of logical block addresses for the memory device for each band of the set, where the accumulation of each count is performed in each accumulator of multiple accumulators for the memory device; and stagger a start of the accumulation of the count by each accumulator by an update size from a start of another accumulator of the multiple accumulators. Each of the accumulators can start their counts at different amounts of host data written to the NAND memory device with respect to a reference zero count. The operations can include operations to: update a data temperature look-up-table when a cumulative amount of the accumulation counts of the bands of the set of bands of logical block addresses reaches a training size in an accumulator of the multiple accumulators; and receive data having a logical block address from a host and route the received data to a block associated with a temperature zone of a number of data temperature zones based on a band of the set of bands of logical block addresses in which the received logical block address belongs and on the data temperature look-up-table. The apparatus can include the count of each accumulator set to zero and another count begun when the cumulative amount of the accumulation counts of the bands of the set of bands of logical block addresses equals a training size for the respective accumulator.

Update of the data temperature look-up-table can include: a sort of the bands of the set of bands of logical block addresses by use of the accumulation count of each band for the respective accumulator of the multiple accumulators; and an allocation of a data temperature for each sorted band. Update of the data temperature look-up-table can include an update of the data temperature look-up-table by use of entries generated by an accumulator having a start triggered by the update size from an accumulator that last updated the data temperature look-up-table. Update of the data temperature look-up-table can include an update of the data temperature look-up-table by use of each accumulator of the multiple accumulators in a sequence in a ring manner in which update of the data temperature look-up-table by a last started accumulator is followed by an update of the data temperature look-up-table by a first started accumulator.

The data temperature look-up-table can include a mapping of each band of the set of bands of logical block addresses into a temperature zone of a number of data temperature zones. The number of data temperature zones includes data temperature zones identified as hot, normal, and cold. The memory device can be realized by a NAND memory device having a three-dimensional memory array. The memory device can be realized by a NAND memory device having a two-dimensional memory array.

In various embodiments, a system can comprise: one or more host processors; a controller coupled to communicate with the one or more host processors; a set of memory devices coupled to the controller, the set of memory devices including a NAND memory device, where the NAND memory device has a memory array arranged in blocks of memory cells, and firmware in which instructions are stored to operate on the NAND memory device arranged in correspondence with logical block addresses. The instructions can include operations to: accumulate a count of host data written to a band of logical block addresses of a set of bands of logical block addresses for the NAND memory device for each band of the set, the accumulation of each count performed in each accumulator of multiple accumulators for the NAND memory device; and stagger a start of the accumulation of the count by each accumulator by an update size from a start of another accumulator of the multiple accumulators. Each of the accumulators can start their counts at different amounts of host data written to the NAND memory device with respect to a reference zero count. The operations can include operations to: sort each band of the set of bands of logical block addresses by the accumulation count of writes of the respective band; allocate a data temperature for each sorted band; map the sorted bands according to the allocated data temperatures into a number of temperature zones; and control routing of data having a logical block address received from a host, based on the mapping.

Variations of such a system can include a number of different embodiments that may be combined depending on the application of the systems and/or the architecture of such systems. Each accumulator of the multiple accumulators can be structured as a single accumulator in a temperature analyzer of a set of multiple temperature analyzers, where each temperature analyzer separate from the other temperature analyzers of the set. The firmware can be associated with a data temperature look-up-table that is used in the control of the routing of data, where the data temperature look-up-table is updated when a cumulative amount of the accumulation counts of the bands of the set of bands of logical block addresses reaches a training size in an accumulator of the multiple accumulators. Update of the data temperature look-up-table can include use of entries generated by an accumulator having a start triggered by the update size from an accumulator that last updated the data temperature look-up-table. Update of the data temperature look-up-table can include use of each accumulator of the multiple accumulators in a sequence in a ring manner in which update of the data temperature look-up-table by a last started accumulator is followed by an update of the data temperature look-up-table by a first started accumulator. The set of bands of logical block addresses can be adaptive in number of LBA bands based on one or more gradients of consecutive LBA bands.

In various embodiments, staggering of host data write accumulators by one or more data temperature analyzers, as taught herein, can provide binning of host data into hot and cold categorized blocks of a NAND memory device by real time tracking of the host over-writing rate. This arrangement of accumulators with their associated data temperature analyzers can provide a close loop feedback to track any host variations. Such arrangements can allow system level memory requirements to be enhanced or optimized by tracking the hotness at a LBA band level instead of an individual LBA level. This binning process may provide improved effective operational performance using the host written data that is labelled hot data.

Tracking data temperatures of ranges of logical block addresses using a stagger start of host data write accumulators by one or more data temperature analyzers can provide for more efficient use of memory space in a memory device, such as a NAND memory device, which, in turn, can provide reduced write amplification. Reduced write amplification can reduce the endurance requirements for a memory device. Trade-offs in endurance for a NAND memory device with respect to other specifications for the memory device may provide for better programming speeds or error margins of the NAND memory device.

Reduced write amplification can also increase the write performance of the NAND memory device. Using arrangements and techniques as taught herein, the number of LBA bands may be varied to expand or contract based on the gradient in over-write rate of each and every LBA band. By gradient is meant the over-write difference between bands two consecutive LBA bands that are directly adjacent, for example band X and band X+1, in the partitioning of the space of LBAs into bands of LBAs. These adjacent bands may also be referred to as conjugate bands. If increasing LBA band counts improve the gradient, the LBA band count can be further incremented. If conjugate LBA bands do not show significant gradient, this occurrence indicates that the LBA band partitions are greater than user data partitions. In this case, LBA band granularity can be reduced. The number of LBA bands may converge to an optimal value as a function of user workloads by analyzing the changes in the host data writes to the ranges of LBA ranges and adjusting the structure of the LBA bands with respect to the intervals of the LBAs that define the bands.

Consider the following example, if the over-write rate of LBA band X is A and the over-write rate of conjugate LBA band X+1 is much greater than (>>) A, it is unknown whether the entire band X+1 has a larger over-write rate or only a smaller fraction of band X+1 has larger over-write rate than band X. There is some probability that band X+1 may have a smaller hot sub-band with larger over-write rate when compared to other sub-bands. On the other hand, if band X and band X+1 have similar over-write rate, it can be assumed with fairly high confidence that the entire LBA range within these bands do not have packets of super hot (a relatively very high frequency of a host data writes) sub-bands with high over-write rate. If there is a huge difference in overwrite rate in between band X and band X+1, the size of the LBA bands may be reduced in an effort to zoom/narrow down to the sub-band or portion of band X+1 which has higher over-write rate. Hence, the number of LBA bands could be dynamically changing based on the over-write difference in between conjugate LBA bands.

The firmware associated with operation of a NAND memory can structure the number of LBA bands to be adaptive based on the gradient of the LBA band. For example, if two conjugate LBA bands have larger delta in the over-write rates than the remaining LBA bands, it may indicate that the LBA bands are at a coarse level and provides an opportunity to reduce the LBA band granularity. On the other hand, if conjugate LBA bands are exactly of the same size with respect to same over-write rate, where over-writes are normalized to LBA band size, an opportunity is provided to consolidate the LBA bands into a single LBA band. Fewer LBA bands could minimize the memory requirement. Fewer LBA bands imply fewer counters in the data temperature analyzers. Fewer counters imply smaller memory size. In other cases larger number of LBA bands can help achieve smaller granularity and provide garbage collection optimization.

Consider the following example with a 256 GB density and start with 10 bands with initial bands being 26 GB in size. Assume that LBA band 0 spans the range 0 GB-26 GB LBA and LBA band 1 spans the range 26 GB-52 GB LBA. Also assume that 45 GB-50 GB is more frequently overwritten when compared to other LBA ranges. In this case, band 1 will have higher over-write rate when compared to band 0. However, LBA band1 is a mix of slower over-write rates from 26 GB-45 GB and higher over-write rates from 45 GB-50 GB. Based on the delta between band 0 and band 1, one could guess that there is probably a sub-band in LBA band 1 that has higher over-write rate (in this example 45 GB-50 GB) when compared to other sub-bands (25 GB-4 5 GB). Reducing the LBA granularities can help bin LBA 0-45 GB to a less over-write cold band and LBA 45 GB-50 GB to a high over-write rate hot band, and thereby achieve better data segregation.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.).

According to one or more embodiments, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon studying the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations.

What is claimed is:

1. A method comprising:
   accumulating a count of host data written to a band of logical block addresses of a set of bands of logical block addresses for a NAND memory device for each band of the set, the accumulation performed in each accumulator of multiple accumulators for a NAND memory device;
   staggering a start of the accumulation of the count by each accumulator by an update size from a start of another accumulator of the multiple accumulators such that each of the accumulator start their count at different amounts of host data written to the NAND memory device with respect to a reference zero count;
   updating a data temperature look-up-table when a cumulative amount of the accumulation counts of the bands of the set of bands of logical block addresses reaches a training size in an accumulator of the accumulators; and
   receiving data having a logical block address from a host and routing the received data to a block associated with a temperature zone of a number of data temperature zones based on a band of the set of bands of logical block addresses in which the received logical block address belongs and on the data temperature look-up-table.

2. The method of claim 1, wherein each accumulator of the multiple accumulators is structured as a single accumulator in a temperature analyzer of a set of multiple temperature analyzers, each temperature analyzer separate from the other temperature analyzers of the set.

3. The method of claim 1, wherein the method includes segregating an entire valid range of logical block addresses of the NAND memory device into the bands of the set of bands of logical block addresses.

4. The method of claim 1, wherein the method includes setting the counts of each accumulator to zero and beginning another count when the cumulative amount of the accumulation counts of the bands of the set of bands of logical block addresses reaches a training size for the respective accumulator.

5. The method of claim 1, wherein updating the data temperature look-up-table includes:
   sorting the bands of the set of bands of logical block addresses by the accumulation count of each band for the respective accumulator of the multiple accumulators; and
   allocating a data temperature for each sorted band.

6. The method of claim 1, wherein updating the data temperature look-up-table includes updating the data temperature look-up-table using entries generated using a accumulator having a start triggered by the update size from an accumulator that last updated the data temperature look-up-table.

7. The method of claim 6, wherein updating the data temperature look-up-table includes updating the data temperature look-up-table using each accumulator of the multiple accumulators in a sequence in a ring manner in which updating the data temperature look-up-table by a last started accumulator is followed by updating the data temperature look-up-table by a first started accumulator.

8. The method of claim 1, wherein routing the received data includes controlling routing of the received data into open blocks of the memory array arranged according to hot, normal, and cold parameters.

9. The method of claim 8, wherein controlling routing of the received data into open blocks of the memory array includes controlling routing the received data such that invalid data is substantially in blocks having hot data.

10. The method of claim 1, wherein routing the received data includes controlling routing of the received data into open blocks of the memory array arranged according to cold block parameters and hot block parameters.

11. An apparatus comprising:
    a memory device having a memory array of memory cells, the memory array arranged in blocks of memory cells; and
    firmware having stored instructions to operate on the memory array arranged in correspondence with logical block addresses, the instructions including operations to:
      accumulate a count of host data written to a band of logical block addresses of a set of bands of logical block addresses for the memory device for each band of the set, the accumulation of each count performed in each accumulator of multiple accumulators for the memory device;
      stagger a start of the accumulation of the count by each accumulator by an update size from a start of another accumulator of the multiple accumulators such that each of the accumulators start their counts at different amounts of host data written to the NAND memory device with respect to a reference zero count;
      update a data temperature look-up-table when a cumulative amount of the accumulation counts of the bands of the set of bands of logical block addresses reaches a training size in an accumulator of the multiple accumulators; and receive data having a logical block address from a host and route the received data to a block associated with a temperature zone of a number of data temperature zones based on a band of the set of bands of logical block addresses in which the received logical block address belongs and on the data temperature look-up-table.

12. The apparatus of claim 11, wherein the apparatus includes the count of each accumulator set to zero and another count begun when the cumulative amount of the accumulation counts of the bands of the set of bands of logical block addresses equals a training size for the respective accumulator.

13. The apparatus of claim 11, wherein update of the data temperature look-up-table includes:
a sort of the bands of the set of bands of logical block addresses by use of the accumulation count of each band for the respective accumulator of the multiple accumulators; and
an allocation of a data temperature for each sorted band.

14. The apparatus of claim 11, wherein update of the data temperature look-up-table includes an update of the data temperature look-up-table by use of entries generated by an accumulator having a start triggered by the update size from an accumulator that last updated the data temperature look-up-table.

15. The apparatus of claim 11, wherein update of the data temperature look-up-table includes an update of the data temperature look-up-table by use of each accumulator of the multiple accumulators in a sequence in a ring manner in which update of the data temperature look-up-table by a last started accumulator is followed by an update of the data temperature look-up-table by a first started accumulator.

16. The apparatus of claim 11, wherein the data temperature look-up-table includes a mapping of each band of the set of bands of logical block addresses into a temperature zone of a number of data temperature zones.

17. The apparatus of claim 16, wherein the number of data temperature zones includes data temperature zones identified as hot, normal, and cold.

18. The apparatus of claim 11, wherein the memory device is a NAND memory device having a three-dimensional memory array.

19. The apparatus of claim 11, wherein the memory device is a NAND memory device having a two-dimensional memory array.

20. A system comprising:
one or more host processors;
a controller coupled to communicate with the one or more host processors;
a set of memory devices coupled to the controller, the set of memory devices including
a NAND memory device, the NAND memory device having a memory array arranged in blocks of memory cells, and
firmware in which instructions are stored to operate on the NAND memory device arranged in correspondence with logical block addresses, the instructions including operations to:
accumulate a count of host data written to a band of logical block addresses of a set of bands of logical block addresses for the NAND memory device for each band of the set, the accumulation of each count performed in each accumulator of multiple accumulators for the NAND memory device;
stagger a start of the accumulation of the count by each accumulator by an update size from a start of another accumulator of the multiple accumulators such that each of the accumulators start their counts at different amounts of host data written to the NAND memory device with respect to a reference zero count;
sort each band of the set of bands of logical block addresses by the accumulation count of writes of the respective band;
allocate a data temperature for each sorted band;
map the sorted bands according to the allocated data temperatures into a number of temperature zones; and
control routing of data having a logical block address received from a host, based on the mapping.

21. The system of claim 20, wherein each accumulator of the multiple accumulators is structured as a single accumulator in a temperature analyzer of a set of multiple temperature analyzers, each temperature analyzer separate from the other temperature analyzers of the set.

22. The system of claim 20, wherein the firmware is associated with a data temperature look-up-table that is used in the control of the routing of data, the data temperature look-up-table updated when a cumulative amount of the accumulation counts of the bands of the set of bands of logical block addresses reaches a training size in an accumulator of the multiple accumulators.

23. The system of claim 20, wherein the update of the data temperature look-up-table includes use of entries generated by an accumulator having a start triggered by the update size from an accumulator that last updated the data temperature look-up-table.

24. The system of claim 20, wherein update of the data temperature look-up-table includes use of each accumulator of the multiple accumulators in a sequence in a ring manner in which update of the data temperature look-up-table by a last started accumulator is followed by an update of the data temperature look-up-table by a first started accumulator.

25. The system of claim 20, wherein the set of bands of logical block addresses is adaptive in number of logical block address bands based on one or more gradients of consecutive logical block address bands.

* * * * *